(12) United States Patent
He

(10) Patent No.: US 11,493,796 B2
(45) Date of Patent: Nov. 8, 2022

(54) DISPLAY SCREEN MODULE AND TERMINAL

(71) Applicant: ZTE Corporation, Shenzhen (CN)

(72) Inventor: Jiacheng He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/601,277

(22) PCT Filed: Oct. 9, 2020

(86) PCT No.: PCT/CN2020/119976
§ 371 (c)(1),
(2) Date: Oct. 4, 2021

(87) PCT Pub. No.: WO2021/082880
PCT Pub. Date: May 6, 2021

(65) Prior Publication Data
US 2022/0163833 A1    May 26, 2022

(30) Foreign Application Priority Data
Oct. 30, 2019   (CN) .......................... 201911045794.2

(51) Int. Cl.
*G02F 1/1333*   (2006.01)
*G02F 1/1335*   (2006.01)

(52) U.S. Cl.
CPC .... *G02F 1/13338* (2013.01); *G02F 1/133331* (2021.01); *G02F 1/133553* (2013.01)

(58) Field of Classification Search
CPC ......... G02F 1/133331; G02F 1/133553; G02F 1/13338; G02F 1/13318; G06V 40/13;
(Continued)

(56) References Cited

U.S. PATENT DOCUMENTS

2016/0283772 A1*  9/2016  Nelson ............... G06V 40/1324
2017/0124376 A1*  5/2017  Wyrwas ............... G09G 3/3406
(Continued)

FOREIGN PATENT DOCUMENTS

CN        107527039 A  * 12/2017  ............... G02B 6/42
CN        108227064 A     6/2018
(Continued)

OTHER PUBLICATIONS

International Searching Authority, International Search Report and Written Opinion for PCT Application No. PCT/CN2020/119976 and English translation, dated Dec. 30, 2020, pp. 1-10.
(Continued)

*Primary Examiner* — Jia X Pan
(74) *Attorney, Agent, or Firm* — Vivacqua Crane, PLLC

(57) ABSTRACT

Disclosed are a display screen module and a terminal device. The display screen module may include: a backlight module, an LCD screen arranged above the backlight module, a light-transmissible cover plate arranged above the LCD screen, a first light source arranged in a backlight light source of the backlight module, a reflective component arranged between the LCD screen and the cover plate, and a light-receiving module configured to receive light reflected by the reflective component so as to carry out fingerprint recognition.

16 Claims, 10 Drawing Sheets

(58) Field of Classification Search
CPC .......... G06V 40/1312; G02V 40/1306; G02V 40/1318; G02V 40/1324; G09G 3/34; G09G 3/36; G09G 3/3406; G09G 3/342
See application file for complete search history.

(56) References Cited

U.S. PATENT DOCUMENTS

| | | | |
|---|---|---|---|
| 2017/0249494 A1* | 8/2017 | Zhang | G02F 1/13338 |
| 2017/0316248 A1* | 11/2017 | He | G06V 40/13 |
| 2019/0113670 A1 | 4/2019 | Mackey et al. | |
| 2019/0266376 A1* | 8/2019 | He | G06V 10/147 |
| 2020/0234024 A1 | 7/2020 | Qing et al. | |
| 2021/0133419 A1* | 5/2021 | Wang | H04M 1/0266 |

FOREIGN PATENT DOCUMENTS

| | | | | |
|---|---|---|---|---|
| CN | 109521590 A | 3/2019 | | |
| CN | 109713003 A | 5/2019 | | |
| CN | 109863508 A | 6/2019 | | |
| CN | 109891432 A | 6/2019 | | |
| KR | 20170099034 A | 8/2017 | | |
| WO | WO-2020035021 A1 * | 2/2020 | ....... | G02F 1/133606 |

OTHER PUBLICATIONS

European Patent Office. Extended European Search Report for EP Application No. 20882000.1, dated May 19, 2022, pp. 1-8.

* cited by examiner

DISPLAY SCREEN MODULE AND TERMINAL

CROSS-REFERENCE TO RELATED APPLICATION

This application is a national stage filing under 35 U.S.C. § 371 of international application number PCT/CN2020/119976, filed Oct. 9, 2020, which claims priority to Chinese patent application No. 201911045794.2, filed Oct. 30, 2019. The contents of these applications are incorporated herein by reference in their entirety.

TECHNICAL FIELD

Embodiments of this disclosure relate to, but are not limited to, the technical field of electronics, and in particular to a display screen module and a terminal device.

BACKGROUND

Nowadays, users tend to have preferences to smart terminals with large battery capacities, ultra-thin bodies and larger display screens, while larger display screens require new designs towards the field of under screen fingerprint identification. Under the demands of large battery capacities, ultra-thin bodies and large display screens, it is conventional to realize under screen fingerprint identification using an Organic Light-Emitting Diode (OLED) screen. However, for manufacturers, the cost of OLED screens is high, and screens having the highest market share at present are Liquid crystal display (LCD) screens which are low in price. Therefore, the requirements for large battery capacities, ultra-thin bodies and large display screens of smart terminals, urges to the need for achieving under screen fingerprint identification using an LCD screen.

SUMMARY

This summary is provided to introduce the subject matter described in detail of this disclosure, and is not intended to limit the scope of protection of the claims.

In accordance with an aspect, an embodiment of this disclosure provides a display screen module and a terminal device, which can be used for realizing under screen fingerprint identification with an LCD screen, thereby meeting the user's requirements.

In accordance with another aspect, an embodiment of this disclosure provides a display screen module, the display screen module may include: a backlight module, an LCD screen arranged above the backlight module, a light-transmissible cover plate arranged above the LCD screen. The display screen module may further include a first light source arranged in a backlight source of the backlight module and independent from the backlight source, a reflective component arranged between the backlight module and the cover plate, and a light receiving module arranged to face the reflective component and configured to receive light reflected by the reflective component.

In accordance with yet another aspect, an embodiment of this disclosure further provides a terminal device, including the display screen module as described in the above aspect.

Additional features and advantages of this disclosure will be set forth in the description which follows, and in part will be apparent from the description, or may be understood by the practice of this disclosure. The objectives and other advantages of this disclosure will be realized and attained by the structure(s) particularly pointed out in the written description and claims as well as the appended drawings.

BRIEF DESCRIPTION OF DRAWINGS

The drawings are provided for a further understanding of the technical schemes of this disclosure, and constitute a part of the specification. The drawings and the embodiments of this disclosure are intended to illustrate the technical schemes of this disclosure and are not intended to limit the technical schemes of this disclosure.

DETAILED DESCRIPTION

In order to make the objects, technical schemes and advantages of this disclosure clearer, this disclosure will be further described in detail with reference to the drawings and embodiments. It should be understood that the specific embodiments described here are only intended to illustrate this disclosure, and are not intended to limit this disclosure.

It should be noted that although a device is divided into functional modules in the schematic diagram of the device, however, in some cases, the device may be divided into different modules. The terms "first", "second", etc., in the specification, claims and the above drawings, if used, are intended to distinguish similar objects, and are not necessarily intended to describe a specific order or sequence.

This disclosure provides a display screen module and a terminal device. A first light source independent from a backlight source is arranged in the backlight source of a backlight module, a reflective component capable of reflecting light transmitted from the cover plate, is arranged between the backlight module and a cover plate, and a light receiving module capable of receiving light reflected by the reflective component for fingerprint identification, is further arranged. With these arrangements under screen fingerprint identification can be realized by the display screen module with an LCD screen. In addition, thanks to the first light source arranged in the backlight source of the backlight module, no additional space for accommodating the first light source is needed. Furthermore, the light receiving module may be arranged to face the reflective component, for example, the light receiving module may be arranged to face a lateral surface of the reflective component and positioned on a propagation path of light reflected by the reflective component. The lateral surface of the reflective component can be at least one of any lateral surfaces other than an upper surface and a lower surface, so that excessively increasing of the thickness of the display screen module can be avoided. Therefore, with the schemes provided in the embodiments of this disclosure, the under-screen fingerprint identification with the LCD screen can be realized without excessively increasing the thickness of the display module, thus meeting user's requirements for large battery capacities, ultra-thin bodies and large display screens of smart terminals.

The embodiments of this disclosure will be further illustrated with reference to the accompanying drawings.

Figure 1:
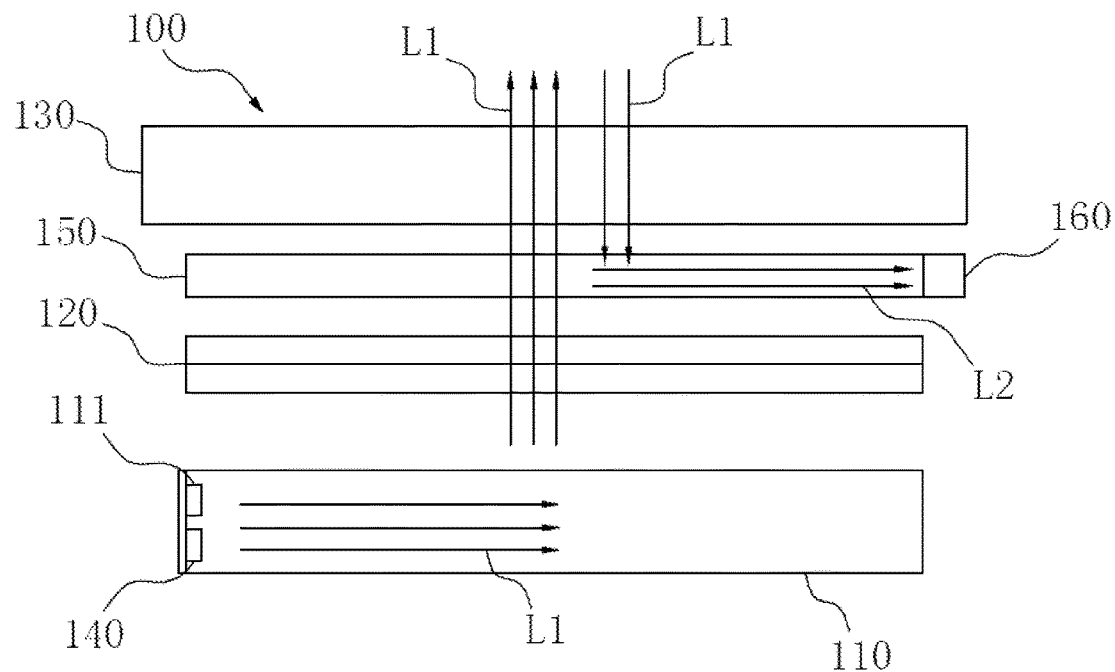
FIG. 1 is a schematic structural diagram of a display screen module as provided in an embodiment of this disclosure.

FIG. 1 is a schematic structural diagram of a display screen module provided in an embodiment of this disclosure.

As shown in FIG. 1, the display screen module 100 includes a backlight module 110, an LCD screen 120 arranged above the backlight module 110, and a light-transmissible cover plate 130 arranged above the LCD screen 120. In addition, the display screen module 100 further includes:

a first light source 140 arranged within a backlight source 111 of the backlight module 110, independent from the backlight source 111, and configured to emit a first light L1 capable of passing through the cover plate 130;

a reflective component 150 arranged between the backlight module 110 and the cover plate 130 and capable of reflecting the first light L1 reflected by a finger pulp to form a second light L2; and a light receiving module 160 arranged to face the reflective component 150 and capable of receiving the second light L2 for fingerprint identification.

Figure 1A:
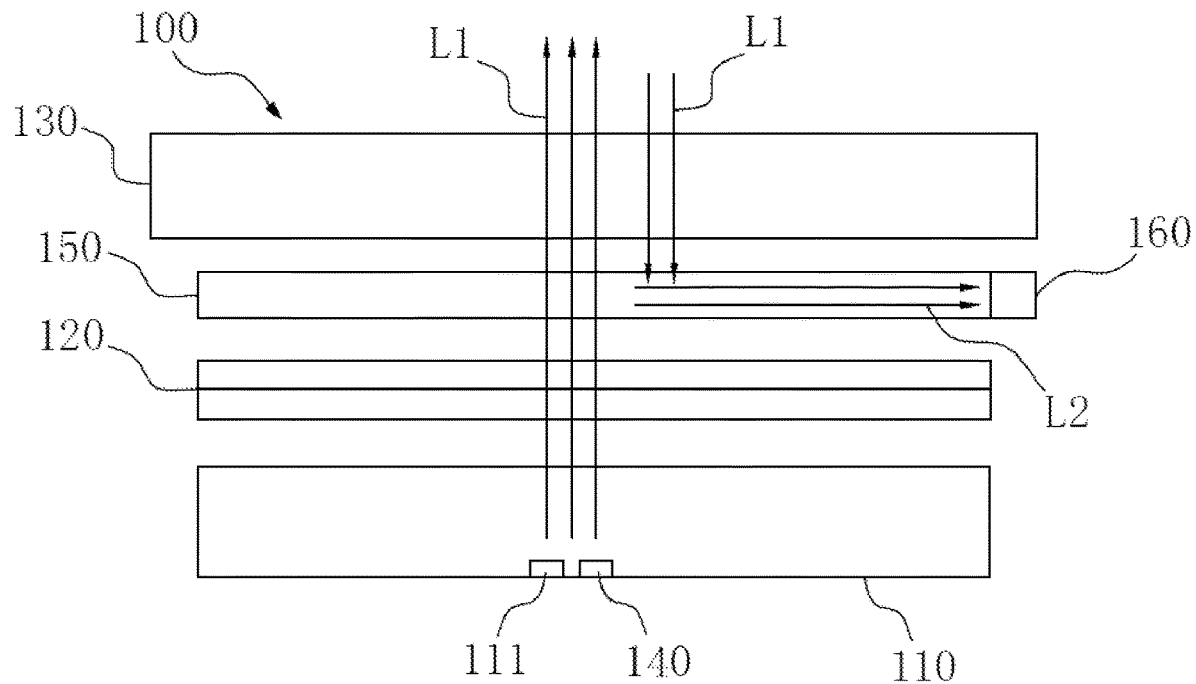
FIG. 1A is a schematic structural diagram of a display screen module as provided in another embodiment of this disclosure.
Figure 1B:
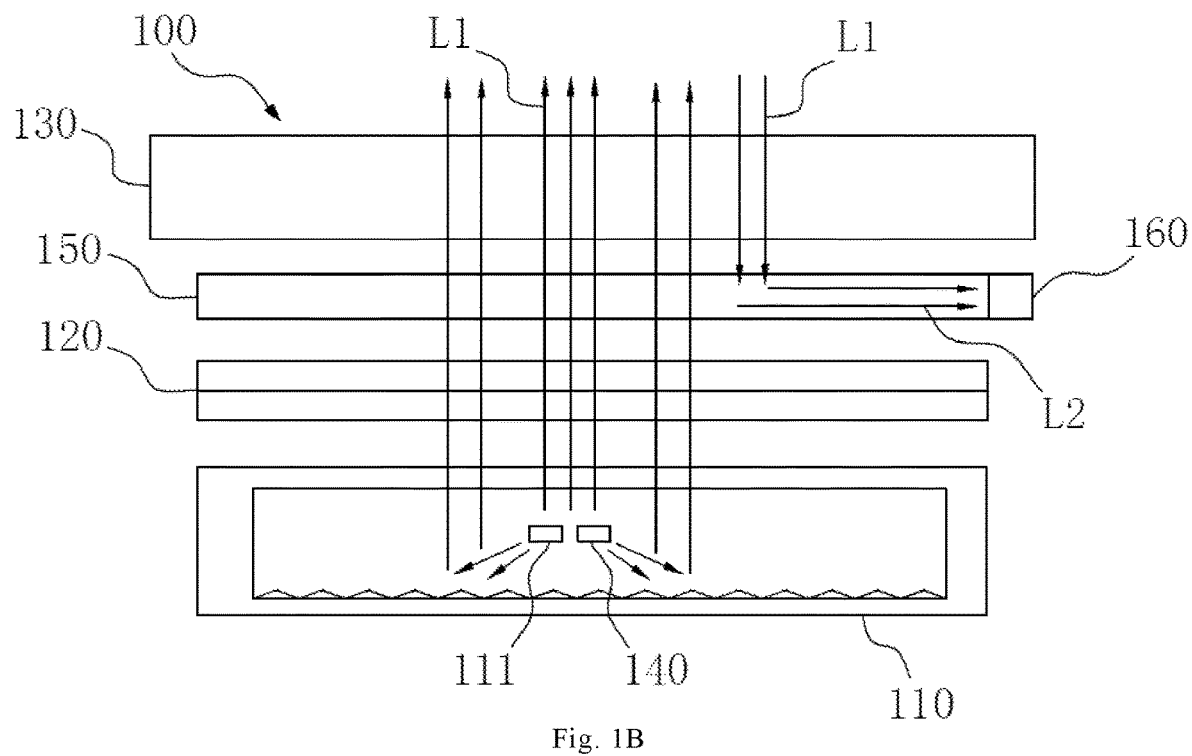
FIG. 1B is a schematic structural diagram of a display screen module as provided in another embodiment of this disclosure.

In an embodiment, the backlight module 110 may be of a side emitting structure, a bottom emitting structure, or a hollow structure. In the case that the backlight module 110 is of a side emitting structure, as shown in FIG. 1, the first light source 140 and the backlight source 111 are both arranged at one side of the backlight module 110. Light emitted by the first light source 140 and light emitted by the backlight source 111 are both incident into the backlight module 110 from the side, the lights are then deflected by backlight module 110, and thus the propagation paths of the lights are changed, such that the lights exit through the LCD screen 120 and the cover plate 130. In the case that the backlight module 110 is of a bottom emitting structure, as shown in FIG. 1A, the first light source 140 and the backlight source 111 are both arranged at a bottom of the backlight module 110. Light emitted by the first light source 140 and light emitted by the backlight source 111 directly travel upward and pass through an upper surface of the backlight module 110, and exit through the LCD screen 120 and the cover plate 130. In the case that the backlight module 110 is of a hollow structure, as shown in FIG. 1B, the first light source 140 and the backlight source 111 are both arranged in a hollow cavity of the backlight module 110. Light emitted by the first light source 140 and light emitted by the backlight source 111 both pass through an upper surface of the backlight module 110, and exit through the LCD screen 120 and the cover plate 130.

In an embodiment, the first light source 140 and the backlight source 111 may be embedded one single circuit board, and are controlled by different control signals, respectively. Alternatively, the first light source 140 and the backlight source 111 may also be embedded in separate circuit boards respectively. Since the first light source 140 and the backlight source 111 are controlled by different control signals respectively, the first light source 140 may be triggered when a user fingerprint is needed, for example, when unlocking or payment through fingerprint identification is needed, so as to allow the first light source 140 to function in a specific application scenario, thus enabling targeted and accurate fingerprint identification. In some examples of this embodiment, the first light source 140 and the backlight source 111 are embedded in one single circuit board, thereby reducing the number of circuit boards, reducing the need for space, and enabling ultra-thin integrated terminals.

In an embodiment, the first light source 140 may be implemented in different manners. For example, the first light source 140 may be an infrared transmitter, or an LED lamp capable of emitting monochromatic light such as blue light or purple light. In the case that the first light source 140 is an infrared transmitter, the light receiving module 160 may be an infrared receiver. In the case that the first light source 140 is an LED lamp capable of emitting monochromatic light such as blue light or purple light, the light receiving module 160 may be a corresponding photosensitive sensor.

In an embodiment, the cover plate 130 may be a glass plate or a transparent acrylic plate as long as the display of the LCD screen 120 is not affected.

Figure 1C:
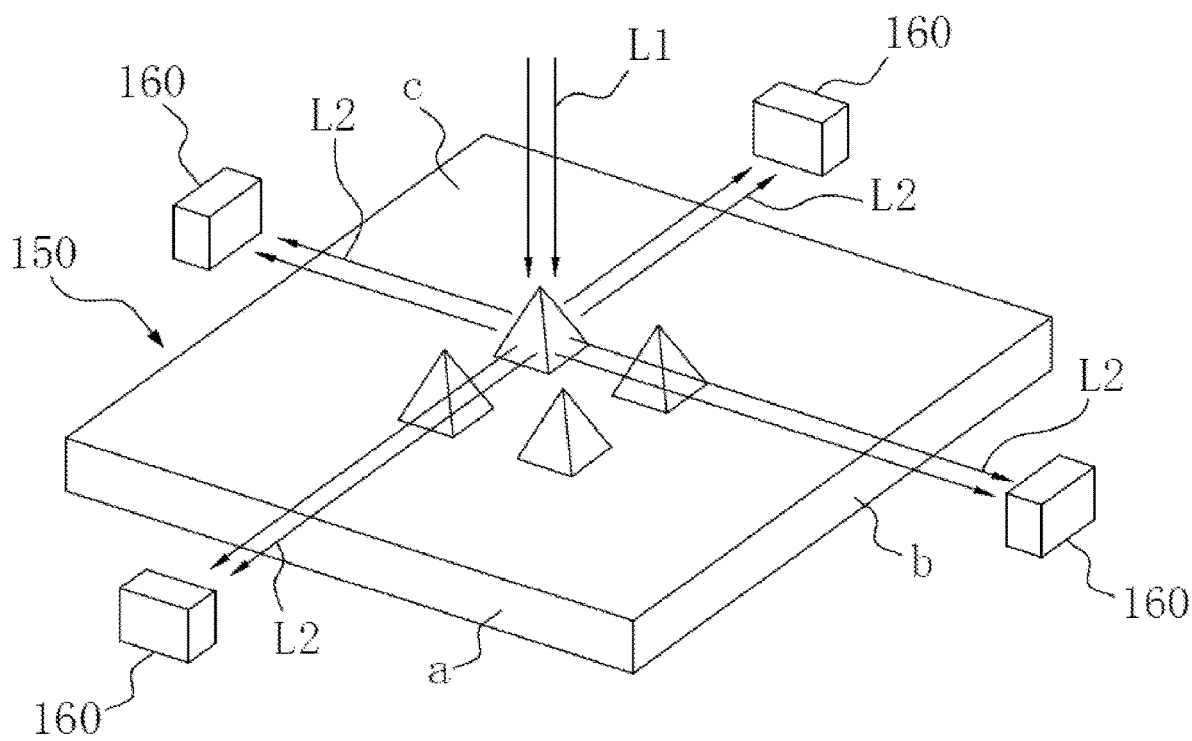
FIG. 1C is a schematic structural diagram of a reflective component of a display screen module as provided in another embodiment of this disclosure.
Figure 1D:
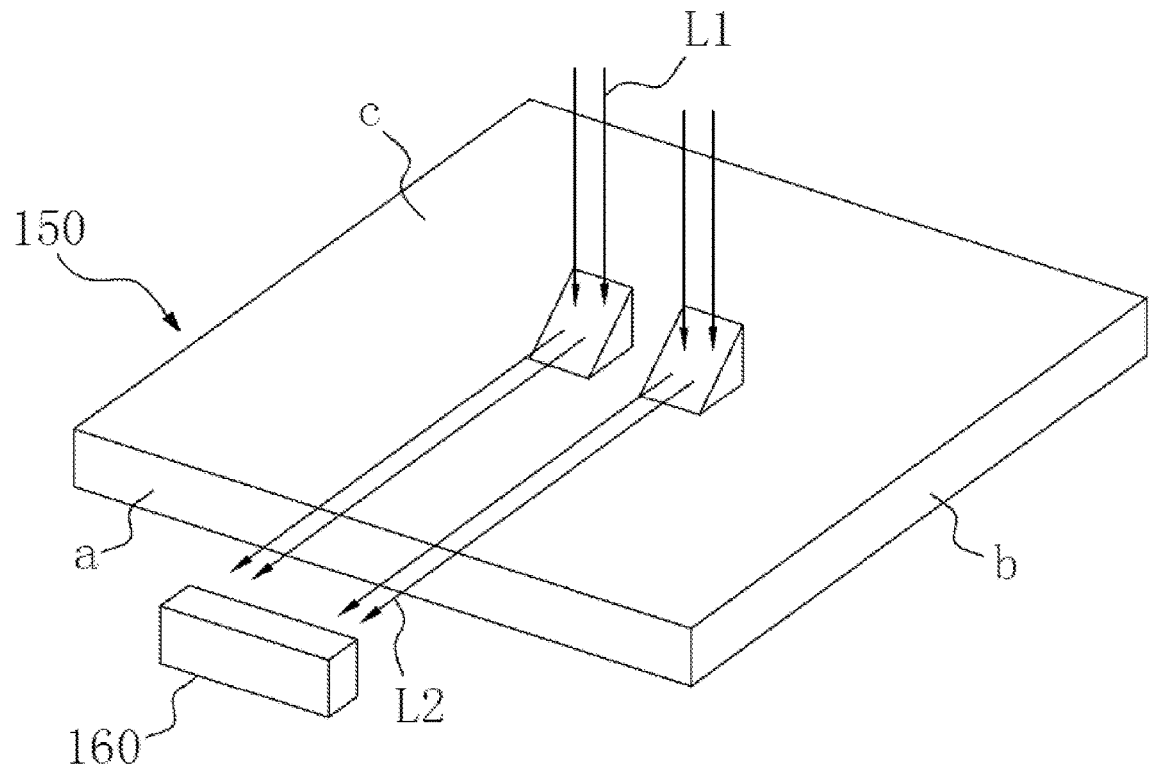
FIG. 1D is a schematic structural diagram of a reflective component of a display screen module as provided in another embodiment of this disclosure.

In an embodiment, a regular pyramid or a triangular prism may be provided in the reflective component 150. As shown in FIG. 1C, the reflective component 150 is provided with a first surface a, a second surface b, a third surface c, a fourth surface and a fifth surface (both the fourth surface and the fifth surface are not shown in FIG. 1C). The first surface a and the fourth surface are arranged opposite to each other, and the second surface b and the fifth surface are arranged opposite to each other. In the case that a regular pyramid is provided in the reflective component 150, the regular pyramid may be provided on the third surface c, so that light reflected by the regular pyramid may exit perpendicularly to at least one of the first surface a, the second surface b, the fourth surface and the fifth surface. In this case, the light receiving module 160 may be correspondingly arranged to face at least one of the first surface a, the second surface b, the fourth surface and the fifth surface. As shown in FIG. 1D, the reflective component 150 is provided with a first surface a, a second surface b, a third surface c, a fourth surface and a fifth surface (both the fourth surface and the fifth surface are not shown in FIG. 1D). The first surface a and the fourth surface are arranged opposite to each other, and the second surface b and the fifth surface are arranged opposite to each other. In the case that a triangular prism is arranged in the reflective component 150, the triangular prism may be provided on the third surface c. The triangular prism has surfaces of a right triangle, and one right-angle side of the right triangle is parallel to the third surface c and the other right-angle side is perpendicular to the third surface c. In this case, the light reflected by the triangular prism may exit perpendicularly to any one of the first surface a, the second surface b, the fourth surface and the fifth surface, and the light receiving module 160 may be correspondingly arranged to face one of the first surface a, the second surface b, the fourth surface and the fifth surface.

In an embodiment, the reflective component 150 may be arranged between the LCD screen 120 and the cover plate 130, or arranged between the backlight module 110 and the LCD screen 120. In the case that the reflective component 150 is arranged between the LCD screen 120 and the cover plate 130, the first light L1 is reflected by the finger pulp and passes through the cover plate 130 and travels towards the reflective component 150, then the first light may be reflected by the reflective component 150 to form second light L2, thereby maintaining sufficient optical power for receiving of the optical receiving module 160. In the case that the reflective component 150 is arranged between the backlight module 110 and the LCD screen 120, the first light L1 is reflected by the finger pulp and passes through the cover plate 130 and the LCD screen 120 and then travel toward the reflective component 150, in this case, the optical power loss of the first light L1 caused by the LCD screen 120 is needed to be considered. The optical power loss caused by the LCD screen 120, for example, may be compensated by increasing the optical power output of the first light source 140. In some examples of this embodiment, the reflective component 150 is arranged between the LCD screen 120 and the cover plate 130.

Figure 1E:
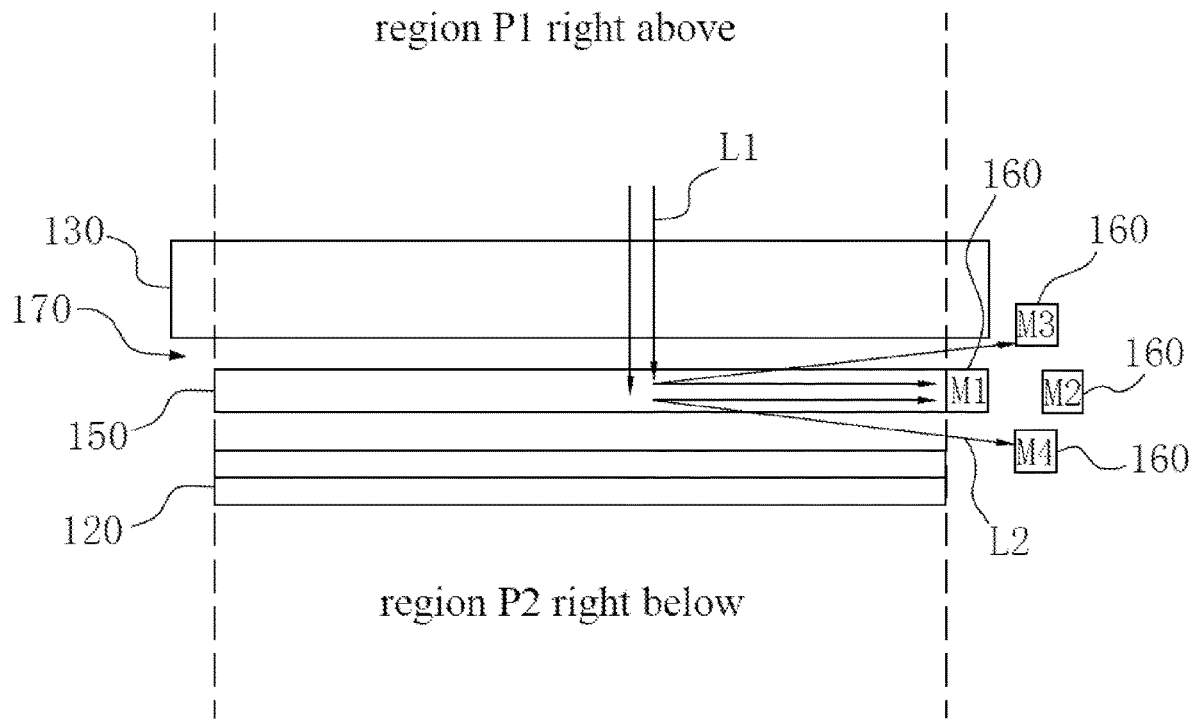
FIG. 1E is a schematic structural diagram of a display screen module as provided in another embodiment of this disclosure.

In an embodiment, as shown in FIG. 1E, the light receiving module 160 may be arranged at any positions where the light receiving module 160 can receive the second light L2 for fingerprint identification, except the region P1 right above reflective component 150 and the region P2 right below the reflective component 150, and except the position above the cover plate 130. In the embodiment as shown in FIG. 1E, a gap 170 is formed between the LCD screen 120 and the cover plate 130, and the reflective component 150 is provided in the gap 170. The reflective component 150 may reflect the first light L1 to form the second light L2, so that the second light L2 can exit from the gap 170. In this case, the light receiving module 160 may be arranged to face the gap 170 and face a lateral surface of the reflective component 15. For example, the light receiving module 160 may be arranged at any one of a first side position M1, a second side position M2, an upper side position M3 and a lower side position M4 in FIG. 1E as long as the light receiving module 160 can effectively receive the second light L2. Therefore, in this embodiment, under screen fingerprint identification can be realized through the LCD screen without excessively increasing the thickness of the display screen module.

In an embodiment, the light receiving module 160 may reserve a wiring port for external connection, and the wiring port may be connected to an external signal processor for fingerprint identification using the second light L2. For example, the wiring port of the light receiving module 160 may be connected to a main control board of the terminal device. After receiving the second light L2, the light receiving module 160 may convert an optical signal corresponding to the second light L2 into a corresponding electrical signal, the electrical signal is transmitted to a signal processor in the main control board of the terminal device through the wiring port, and is processed by the signal processor for fingerprint identification. Furthermore, the light receiving module 160 may further contain a signal processor. After the light receiving module 160 receives the second light L2, the signal processor of the light receiving module 160 may perform a fingerprint identification based on the optical signal corresponding to the second light L2. In addition, after the fingerprint identification performed by the signal processor of the light receiving module 160 is completed, the light receiving module 160 may transmit an obtained identification result to an external device to perform other related operations. For example, the light receiving module 160 may transmit the obtained identification result to the main control board of the terminal device to for unlocking or payment operations through fingerprint identification.

Figure 2:
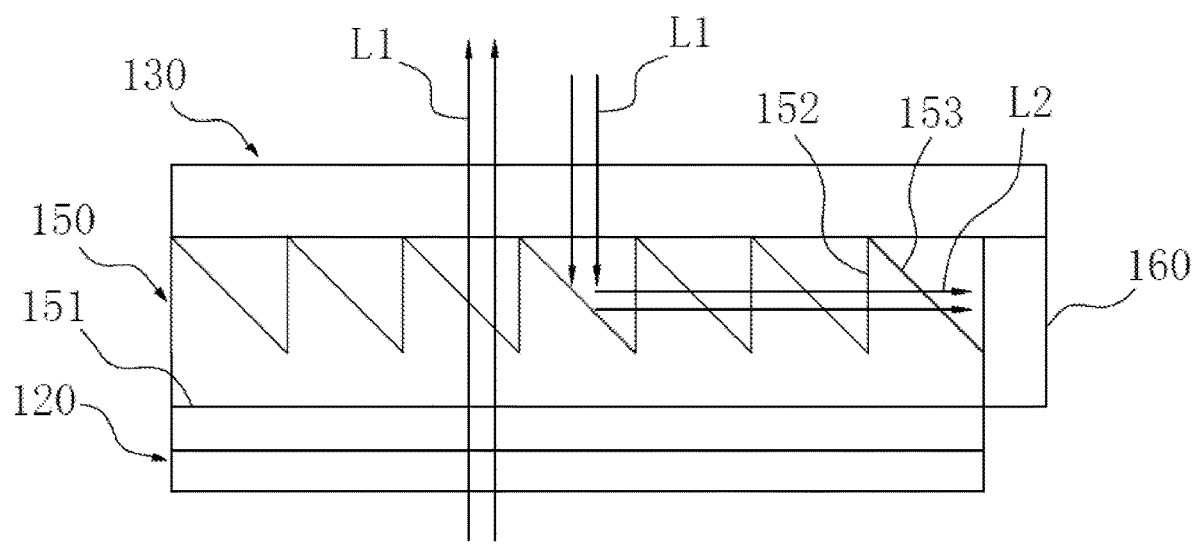
FIG. 2 is a schematic structural diagram of a reflective component of a display screen module as provided in another embodiment of this disclosure.

In the embodiment shown in FIG. 1, the first light source 140 independent from the backlight source 111 is arranged in backlight source 111 of the backlight module 110, no additional space is needed for the first light source 140. In addition, the reflective component 150 arranged between the backlight module 110 and the cover plate 130 can reflect the first light L1 that is reflected by the finger pulp to form the second light L2 to be received by the light receiving module 160. The light receiving module 160 may be arranged to face the reflective component 150, for example, to face a lateral surface of the reflective component 150 and may be positioned on a propagation path of the second light L2. The lateral surface of the reflective component 150 is at least one of side surfaces other than the upper side surface and the lower side surface, so that the problem of excessively increasing the thickness of the display screen module 100 can be avoided. In addition, since the light receiving module 160 enables the fingerprint identification using the second light L2, the under-screen fingerprint identification through the LCD screen 120 can be realized. In this embodiment, the under-screen fingerprint identification through the LCD screen can be realized without excessively increasing the thickness of the display module 100, thus meeting the user's requirements for large battery capacities, ultra-thin bodies and large display screens of smart terminal devices. As shown in FIG. 2, in an embodiment, the reflective component 150 is provided with a first light incident surface 151 allowing the incident of the first light L1, a light transmitting surface 152 perpendicular to the first light incident surface 151, and a light reflective surface 153 capable of reflecting the first light L1 to form a second light L2. The light reflective surface 153 extends to a position where the light reflective surface 153 is connected with the light transmitting surface 152, and the first light incident surface 151 is arranged to face the LCD screen 120.

In an embodiment, as the first light L1 passes through the LCD screen 120 and reaches the reflective component 150, the first light L1 enters the interior of the reflective component 150 through the first light incident surface 151. As the first light L1 propagates in the interior of the reflective component 150 and reaches the rear surface of the light reflective surface 153, the first light L1 may pass through the light reflective surface 153 and enter the cover plate 130, and then the first light L1 may exit from the cover plate 130. The first light L1, as the user puts his/her finger pulp close to or against the surface of the cover plate 130 for unlocking or payment through fingerprint identification, propagates toward the finger pulp, then the first light L1, is reflected by the finger pulp, may propagate backward to the interior of the cover plate 130. At this point, the first light L1 carries fingerprint information corresponding to the finger pulp. The first light L1 carrying fingerprint information, after passing through the cover plate 130, is deflected by the light reflective surface 153 of the reflective component 150 when reaching the light reflective surface 153, the propagation path of the first light L1 carrying fingerprint information is thus changed by reflection of the light reflective surface 153. As such, the first light L1 carrying fingerprint information is deflected by the light reflective surface 153 to form a second light L2. After the light receiving module 160 receives the second light L2, the fingerprint information may be subsequently processed by an external processor for fingerprint identification operations based on the fingerprint information.

In an embodiment, as the first light L1 reaches the cover plate 130 through the light reflective surface 153 or is reflected by the light reflective surface 153 to form the second light L2, part of the optical power may be lost due to the reflection or transmission. The intensity of the optical power emitted by the first light source 140 may be increased such that, the second light L2 received by the light receiving module 160 is sufficient for fingerprint identification. Since the first light source 140 and the backlight source 111 are independently controlled from each other, increasing the optical power output of the first light source 140 would not hinder the backlight source 111 from proper operation.

Figure 2A:
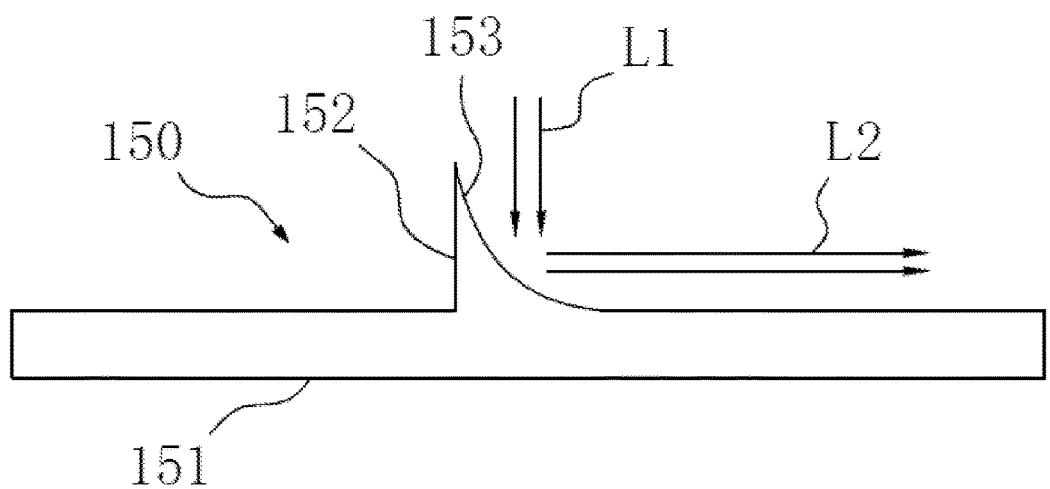
FIG. 2A is a schematic structural diagram of a reflective component of a display screen module as provided in another embodiment of this disclosure.
Figure 2B:
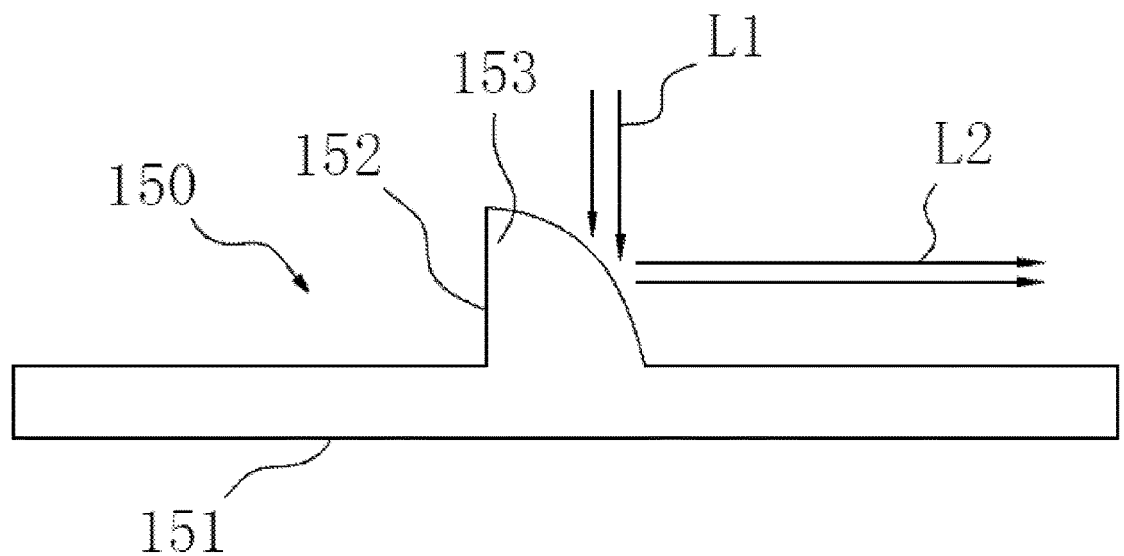
FIG. 2B is a schematic structural diagram of a reflective component of a display screen module as provided in another embodiment of this disclosure.

In an embodiment, the light reflective surface 153 may have various implementations. For example, the light reflective surface 153 may be a concave curved surface, a convex curved surface, or a plane surface. In the case that the light reflective surface 153 is a concave curved surface, as shown in FIG. 2A, the light reflective surface 153 is inwardly curved to recess toward a joint where the first light incident surface 151 and the light transmitting surface 152 joint together. In this case, when the first light L1 is reflected at the recess to form a second light L2, the second light L2 may travel in a direction along which the reflective component 150 extends, as shown in FIG. 2A. In the case that the light reflective surface 153 is a convex curved surface, as shown in FIG. 2B, the light reflective surface 153 is outwardly curved to protrude away from the joint where the first light incident surface 151 and the light transmitting surface 152 joint together. In this case, when the first light L1 is reflected at a convex position where the light reflective surface 153 is outwardly curved to form a second light L2, the second light L2 may travel in a direction along which the reflective component 150 extends, as shown in FIG. 2B. In the case that the light reflective surface 153 is a plane surface, as shown in FIG. 2, the light reflective surface 153 may form an acute angle with the first light incident surface 151. In this case, when the first light L1 is reflected on the light reflective surface 153 to form a second light L2, the second light L2 may travel along a direction along which the reflective component 150 extends, and reach the light receiving module 160, as shown in FIG. 2.

In an embodiment, the reflective component 150 may be a transparent glass film or a transparent acrylic film, as long as the reflective component exhibits good transparency and reflectivity for light while would not hinder the display of the LCD screen 120.

Figure 2C:
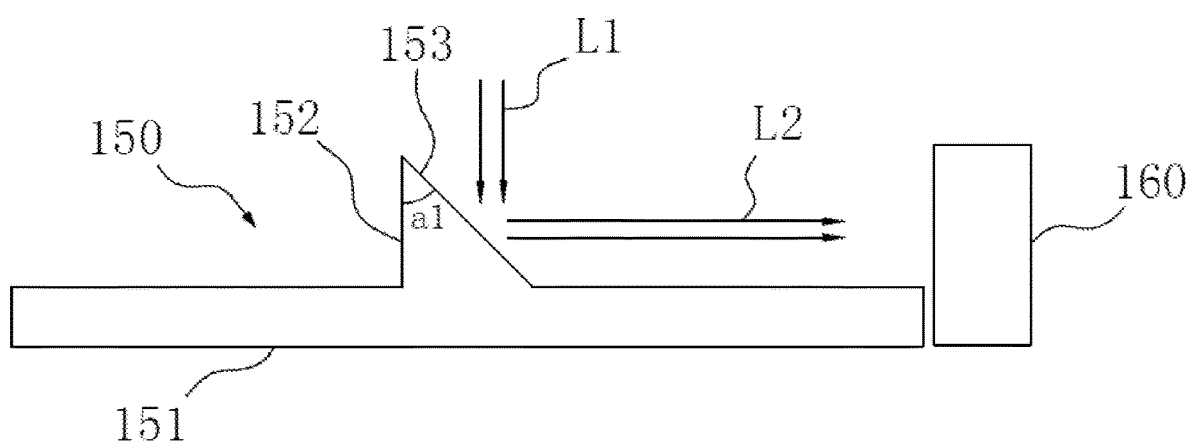
FIG. 2C is a schematic structural diagram of a reflective component of a display screen module as provided in another embodiment of this disclosure.

In addition, in another embodiment, as shown in FIG. 2C, as an implementation of the light reflective surface 153 in the embodiment shown in FIG. 2, the light reflective surface 153 is a plane surface such that an acute angle a1 may be form by the light reflective surface 153 and the light transmitting surface 152.

In this embodiment, the degree of the acute angle a1 formed by the light reflective surface 153 and the light transmitting surface 152 may be appropriately adjusted according to actual use needs. In some examples of this embodiment, the acute angle a1 formed by the light reflective surface 153 and the light transmitting surface 152 is 45°. As shown in FIG. 2C, in the case that the first light L1 reflected by the finger pulp is a vertically oriented light, the vertically oriented light may be reflected by the light reflective surface 153 to form a second light L2 parallel to the first light incident surface 151. Therefore, the light receiving module 160 may be arranged to face a lateral side of the reflective component 150, so that the second light L2 parallel to the first light incident surface 151 can be effectively received by the light receiving module 160, thus no excessive increase is made to the thickness of the display screen module.

In addition, in another embodiment, two or more light transmitting surfaces 152 and two or more light reflective surfaces 153 of the reflective component 150 are provided, and the light transmitting surfaces 152 and light reflective surfaces 153 are alternatively arranged at an interval in a direction along which the reflective component 150 extends.

Figure 3:
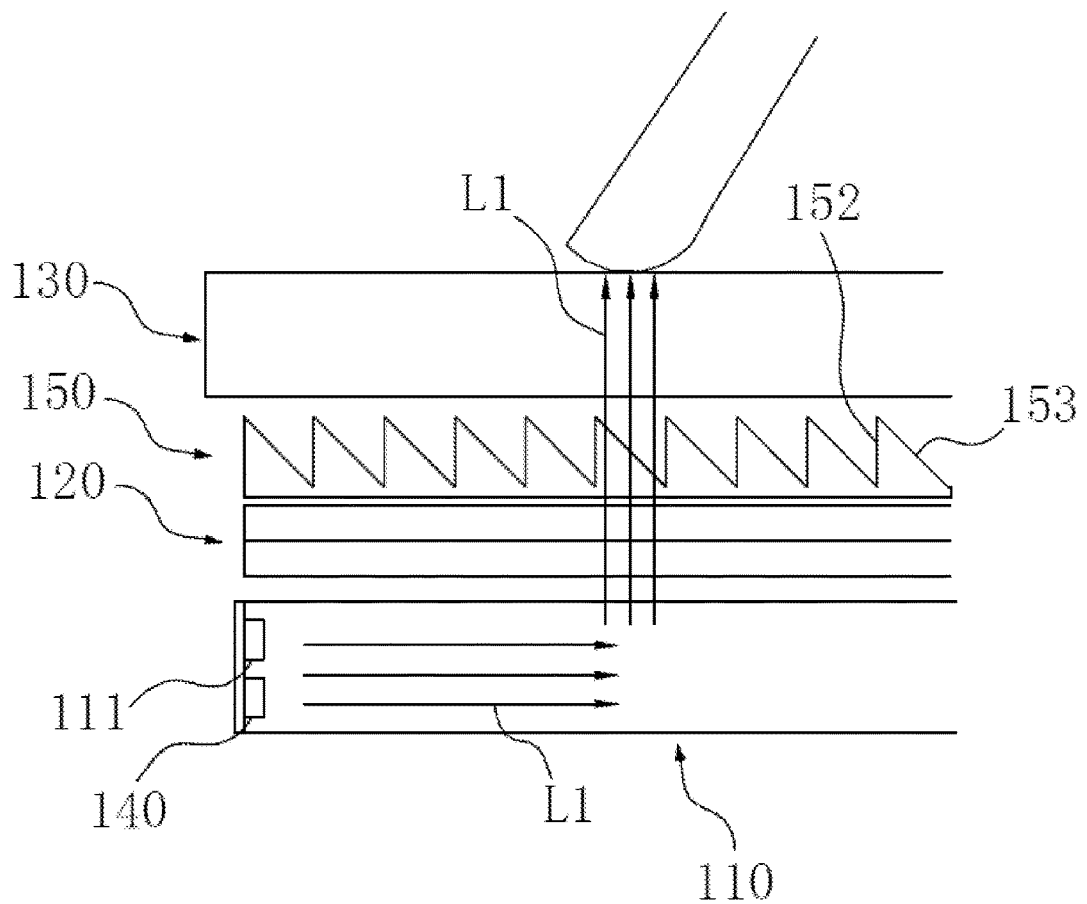
FIG. 3 is a schematic diagram of a light path along which a first light is propagating out as provided in an embodiment of this disclosure.
Figure 4:
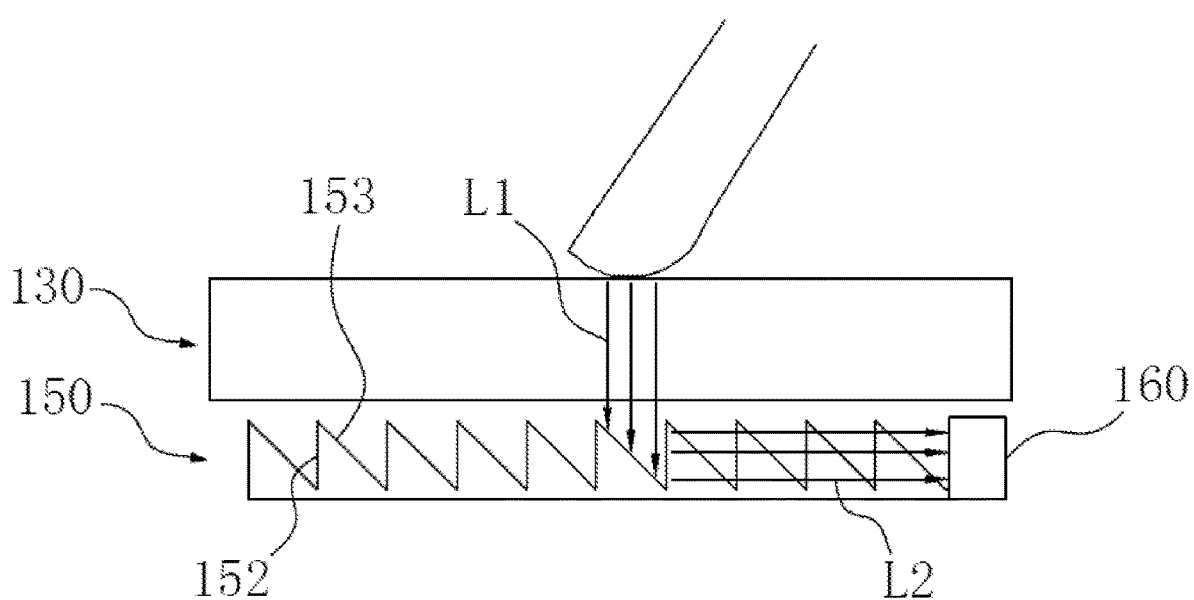
FIG. 4 is a schematic diagram of a light path in which a first light forms a second light as provided in an embodiment of this disclosure.

In this embodiment, referring to the schematic diagram of a light path along which a first light is propagating out, as shown in FIG. 3, the first light L1 travels upward from bottom of the reflective component 150 towards a rear surface of the light reflective surface 153, passes through the light reflective surface 153 and reaches the cover plate 130. As the first light L1 is reflected by the finger pulp, passes through the cover plate 130 again and reaches a front surface of the light reflective surface 153, referring to the schematic diagram of an optical path of a first light L1 forming a second light L2 shown in FIG. 4, the first light L1 may be reflected by the front surface of the light reflective surface 153 to form the second light L2, and the second light L2 is thus deflected and travels towards the light transmitting surface 152 which allows transmission of light. Therefore, the second light L2 may pass through the light transmitting surface 152 and travels towards the rear surface of the light reflective surface 153, and then the second light L2 sequentially passes through the rear surface of the light reflective surface 153 and the light transmitting surface 152 and reaches the light receiving module 160.

In this embodiment, since the light transmitting surfaces 152 and the light reflective surfaces 153 are alternatively arranged at an interval in a direction along which the reflective component 150 extends, the light transmitting surfaces 152 and the light reflective surfaces 153 may be distributed over the entire reflective component 150, that is, the first light L1 formed by the first light source 140 can have a full coverage over the entire screen by the backlight module 110, thus the user can perform fingerprint identification at any position on the screen, thereby achieving full-screen fingerprint identification and improving user experience.

Figure 5:
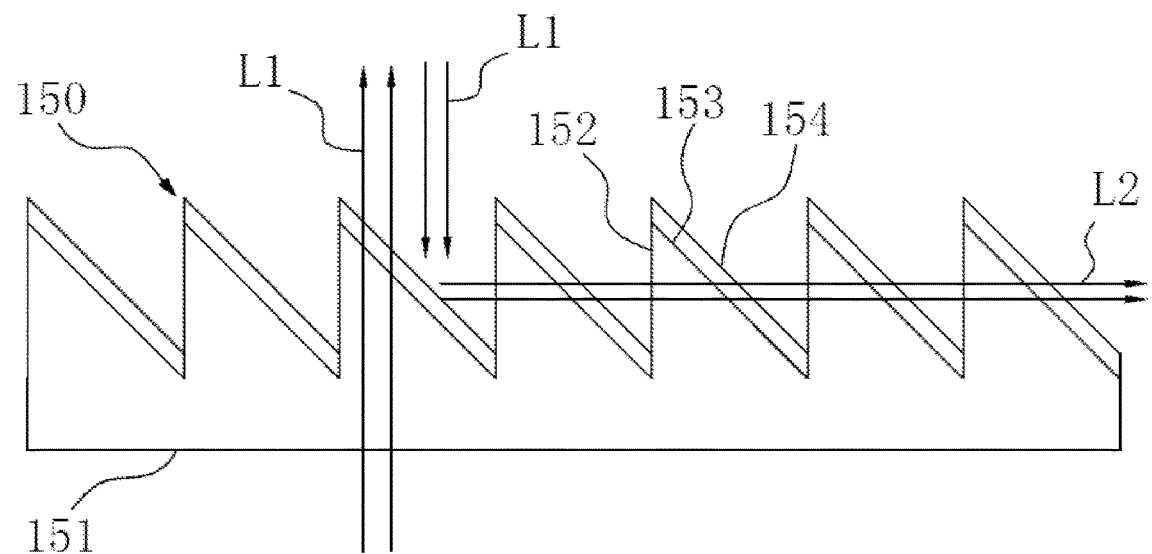
FIG. 5 is a schematic structural diagram of a reflective component of a display screen module as provided in another embodiment of this disclosure.

Referring to FIG. 5, in an embodiment, the light reflective surface 153 is coated with a reflective coating 154 capable of directional reflection of light.

In an embodiment, as shown in FIG. 5, directional reflection means that the light travelling from the first light incident surface 151 towards the rear surface of the light reflective surface 153 would be allowed to pass through the reflective coating 154 and propagate outward, and the light travelling from outer of the reflective component 150 to the reflective coating 154, would be reflected on the surface of the reflective coating 154 to form a reflected light.

In an embodiment, the reflective coating 154 may have various implementations. For example, the reflective coating 154 may be made of an electro-chromic material and a transparent conductive film. For example, an electro-chromic film may be formed from the electro-chromic material first, and then the electro-chromic film and the transparent conductive film may be laminated together. In the case that the reflective coating 154 is made of the electro-chromic material and transparent conductive film, an additionally provided thin-film field effect transistor switching circuit may be used with reflective coating 154 to realize the reflection of the first light L1. For example, when the user performs unlocking by fingerprint, the terminal device sends a corresponding electrical signal to the thin-film field effect transistor switching circuit, so that the reflective coating 154 can reflect the first light L1. Since the thin-film field effect transistor switching circuit is a conventional circuit, the operating principle of such a circuit will not be described in detail here. For another example, the reflective coating 154 may be made of a metal thin film with high reflectivity, such as a metal thin film like chromium thin film, aluminum thin film or iridium thin film which is very fine and not directly visible by human eyes. In the case that the reflective coating 154 is made of the metal thin film with high reflectivity, the reflective component 150 may be made of a polymer material with high transparency for light, so that the reflective component 150 exhibits good light transparency and reflectivity for light.

In an embodiment, the reflective coating 154 may be coated on an outward-facing side of the light reflective surface 153 by, for example, sputtering, vapor deposition, chemical vapor deposition, dip coating, die coating, wet coating, spray coating or other methods. In some examples, the method may be appropriately selected from these methods according to the shape and the like factors of the light reflective surface 153.

It shall be understood by those having ordinary skill in the art that an electro-chromic material is a material of which various physical properties such as reflectivity and color are reversibly changed by electricity. A material of which the structure is reversibly changeable by, for example, applying a voltage may be used as an electro-chromic material. A reflective dimming material of which the reflection characteristics are changeable by, for example, doping or de-doping of protons or the like may be used as an electro-chromic material. The so-called reflective dimming material is specifically a material whose optical properties are controllably changeable between a transparent state, a mirror state, and/or an intermediate state by external stimulation. An alloy material of for example magnesium and nickel, an alloy material mainly composed of an alloy material of magnesium and titanium, or the like may be used as the reflective dimming material.

It would be understood by those having ordinary skill in the art that the transparent conductive film is a transparent conductive film mainly composed of a conductive material having transparency in a visible region. The transparent conductive film is mainly composed of transparent conductive materials such as tin oxide, zinc oxide, carbon nanotube-containing body, indium-doped tin oxide, indium-doped zinc oxide, and antimony-doped tin oxide. Alternatively, a layer in which nanoparticles, nanorods, and nanowires of conductive materials such as nanoparticles and metals of these materials are dispersed in a resin at a high concentration may be used.

Figure 6:
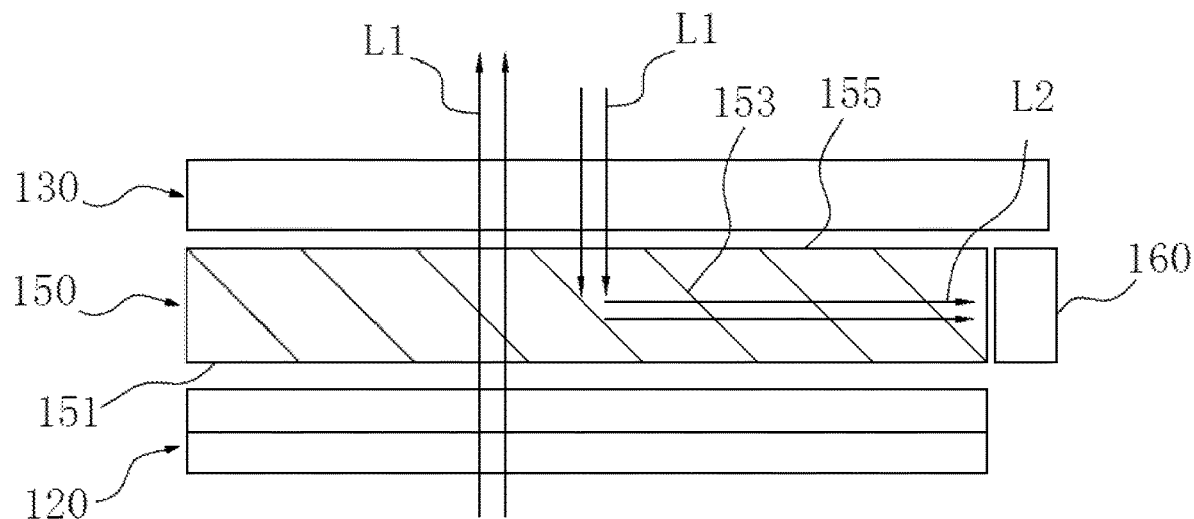
FIG. 6 is a schematic structural diagram of a reflective component of a display screen module as provided in another embodiment of this disclosure.

As shown in FIG. 6, this disclosure proposes another embodiment which is parallel to the embodiment shown in FIG. 2. This embodiment has similar operation principles and identical technical effects as compared to the embodiment shown in FIG. 2. The difference between the two lies in that: the light reflective surface 153 in this embodiment is inside the reflective component 150, while the light reflective surface 153 in the embodiment shown in FIG. 2 forms an outer surface of the reflective component 150. The difference between the two will be illustrated in detail below, and the same content of the two may be referred to the content described in the above embodiment.

In the embodiment shown in FIG. 6, the reflective component 150 is provided with a first light incident surface 151 allowing incidence of a first light L1 and a second light incident surface 155. A light reflective surface 153 which can reflect the first light L1 to form a second light L2 is arranged between the first light incident surface 151 and the second light incident surface 155. The first light incident surface 151 is arranged to face the LCD screen 120, and the second light incident surface 155 is arranged to face the cover plate 130.

In an embodiment, the first light incident surface 151 and the second light incident surface 155 may be arranged in parallel or non-parallel to each other, but this would not affect the propagation path of light. The arrangement in which the first light incident surface 151 and the second light incident surface 155 are arranged in parallel to each other, can facilitate the assembly of the display screen module.

In an embodiment, a metal film capable of directional reflection may be arranged in the reflective component 150, and the light reflective surface 153 is formed by one side of the metal film facing the cover plate 130. In addition, the reflective component 150 may be divided into two parts made of the same material, and any interface between the two parts may form the light reflective surface 153.

In an embodiment, the light reflective surface 153 may be a concave curved surface, a convex curved surface, or a plane surface. Similar to the embodiment shown in FIG. 2A, in the case that the light reflective surface 153 is a concave curved surface, the light reflective surface 153 may converge the first light L1 into the interior of the reflective component 150 to form the second light L2, so that the second light L2 travels inside the reflective component 150 in a direction along which the reflective component 150 extends. Similar to the embodiment shown in FIG. 2B, in case that the light reflective surface 153 is a convex curved surface, the light reflective surface 153 protrudes outward in a direction along which the reflective component 150 extends. When the first light L1 is reflected at a convex position where the light reflective surface 153 protrudes outward to form a second light L2, the second light L2 may propagate inside the reflective component 150 in a direction along which the reflective component 150 extends. Similar to the embodiment shown in FIG. 2C, in case that the light reflective surface 153 is plane surface, the light reflective surface 153 may form an acute angle with the first light incident surface 151, and when the first light L1 is reflected by the light reflective surface 153 to form a second light L2, the second light L2 may propagate inside the reflective component 150 in a direction along which the reflective component 150 extends. Since the second light L2 propagates inside the reflective component 150, the light receiving module 160 may be arranged adjacent to a lateral side of the reflective component 150 and located on a propagation path of the second light L2, thereby avoiding an excessive increase in the thickness of the display screen module. The implementations regarding the shape and structure of the light reflective surface 153 in this embodiment share the same technical principles and technical effects of reflecting the first light L1 to form the second light L2 as those respectively described in the embodiments shown in FIGS. 2A, 2B and 2C regarding various shapes and structures of light reflective surface 153. The difference lies merely in whether the light reflective surface 153 is inside the reflective component 150 or forms an outer surface of the reflective component 150.

Figure 7:
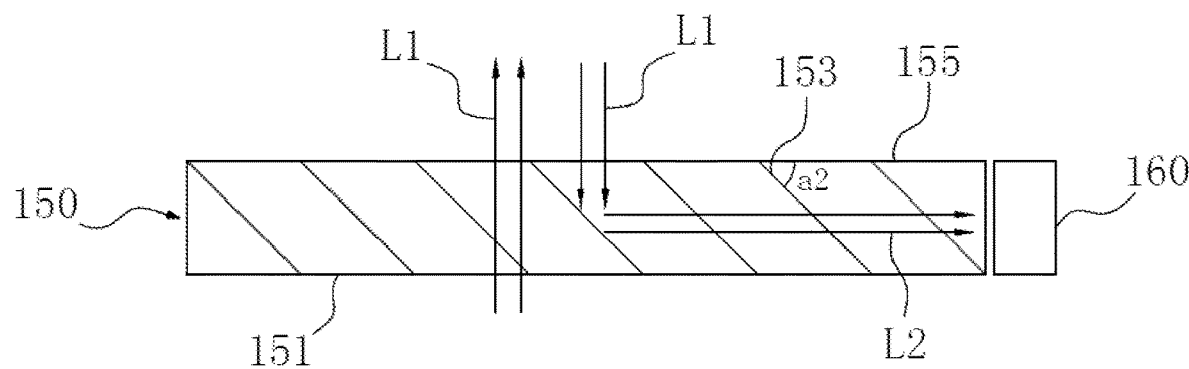
FIG. 7 is a schematic structural diagram of a reflective component of a display screen module as provided in another embodiment of this disclosure.

Referring to FIG. 7, in another embodiment, as an implementation of the light reflective surface 153 in the embodiment shown in FIG. 6, the light reflective surface 153 is a plane that may forms an acute angle a2 with the second light incident surface 155, and the first light incident surface 151 and the second light incident surface 155 are arranged parallel to each other.

In this embodiment, the degree of the acute angle a2 formed by the light reflective surface 153 and the second light incident surface 155 may be appropriately adjusted according to actual use needs. In some examples of this embodiment, the acute angle a2 formed by the light reflective surface 153 and the second light incident surface 155 is 45°. In case that the first light L1 reflected by the finger pulp is a vertically oriented light, the vertically oriented light may be vertically incident on the second light incident surface 155 and reflected by the light reflective surface 153 to form a second light L2 parallel to the second light incident surface 155. Therefore, the second light L2 may propagate in the reflective component 150 along a light path parallel to the second light incident surface 155. Thus, the light receiving module 160 may be arranged to face a lateral side of the reflective component 150, and located on the propagation path of the second light L2, so that the light receiving module 160 can effectively receive the second light L2 parallel to the second light incident surface 155, thus avoiding an excessive increase in the thickness of the display screen module.

Furthermore, in another embodiment, two or more light reflective surfaces 153 are arranged between the first light incident surface 151 and the second light incident surface 155, and the light reflective surfaces 153 are uniformly distributed inside the reflective component 150, and any two adjacent light reflective surfaces 153 are arranged in parallel.

Figure 8:
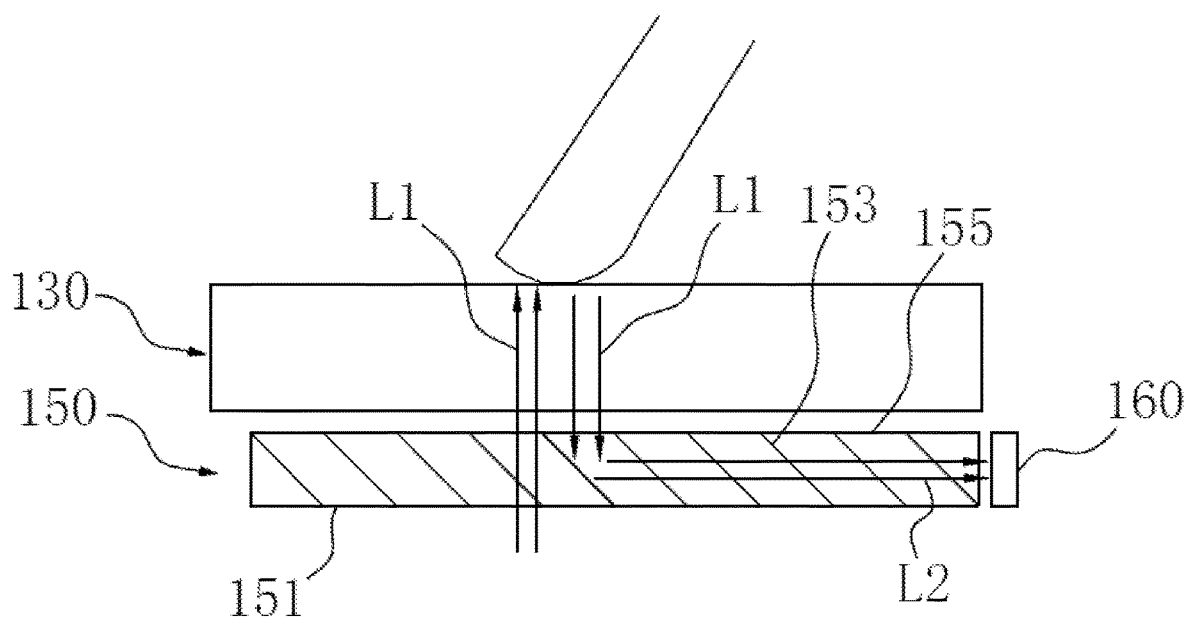
FIG. 8 is a schematic structural diagram of a reflective component of a display screen module as provided in another embodiment of this disclosure.

In this embodiment, referring to FIG. 8, as the first light L1 passes through the first light incident surface 151 from bottom of the reflective component 150 and travels upward to a rear surface of the light reflective surface 153, the first light L1 may successively pass through the light reflective surfaces 153 and the second light incident surface 155 and travels towards and through the cover plate 130. Then the first light L1 is reflected by the finger pulp, passes through the cover plate 130 and travels towards the second light incident surface 155. Then the first light L1 may pass through the second light incident surface 155 and reaches the light reflective surfaces 153. At the light reflective surfaces 153, the first light L1 may be reflected by the current light reflective surfaces 153 to form a second light L2 which travels towards a rear surface of an adjacent light reflective surface 153. Then, the second light L2 successively passes through the rear surface of each light reflective surface 153 and travels towards a light receiving module 160, and can be received by the light receiving module 160.

In this embodiment, since the light reflective surfaces 153 are evenly distributed inside the reflective component 150 and any two adjacent light reflective surfaces 153 are arranged in parallel to each other, the light reflective surfaces 153 can be distributed over the entire reflective component 150, that is, the first light L1 formed by the first light source 140 can have a full coverage over the entire screen by the backlight module 110, the user can perform fingerprint identification at any position of the entire screen, thereby achieving full-screen fingerprint identification and improving the user experience.

Figure 9:
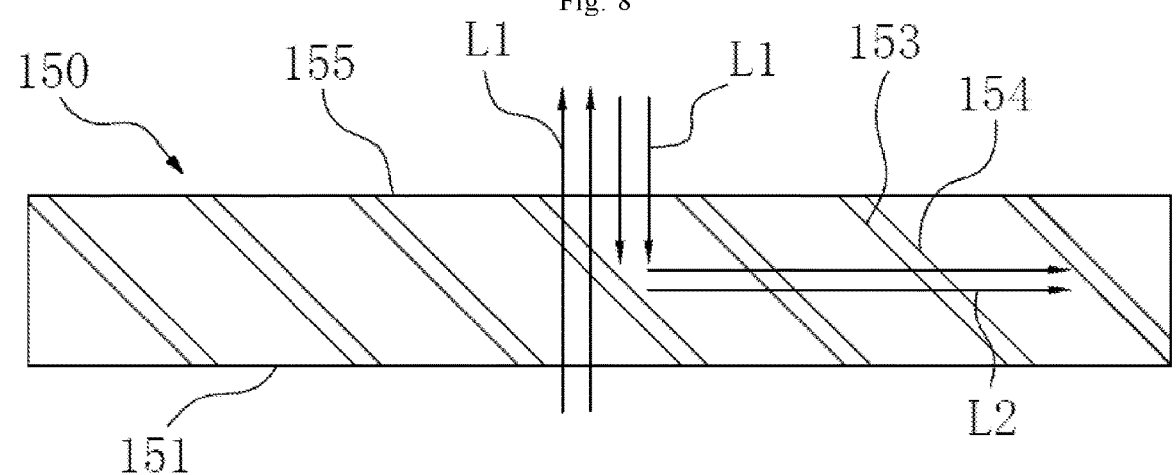
FIG. 9 is a schematic structural diagram of a reflective component of a display screen module as provided in another embodiment of this disclosure.

Referring to FIG. 9, in an embodiment, a reflective coating 154 capable of directional reflection is coated at one side of the light reflective surface 153 facing the second light incident surface 155.

In an embodiment, as shown in FIG. 9, directional reflection means that light is allowed to pass through the reflective coating 154 when travelling from the first light incident surface 151 towards the second light incident surface 155, but is reflected at the reflective coating 154 when the light is travelling from the second light incident surface 155 towards the reflective coating 154.

In an embodiment, the reflective coating 154 may be composed of an electro-chromic material and a transparent conductive film, or may be composed of a metal film with high reflectivity. The composition principle, generation method and technical effects of the reflecting coating 154 have been described in detail in the above embodiments, and therefore will not be described in detail here.

Figure 10:
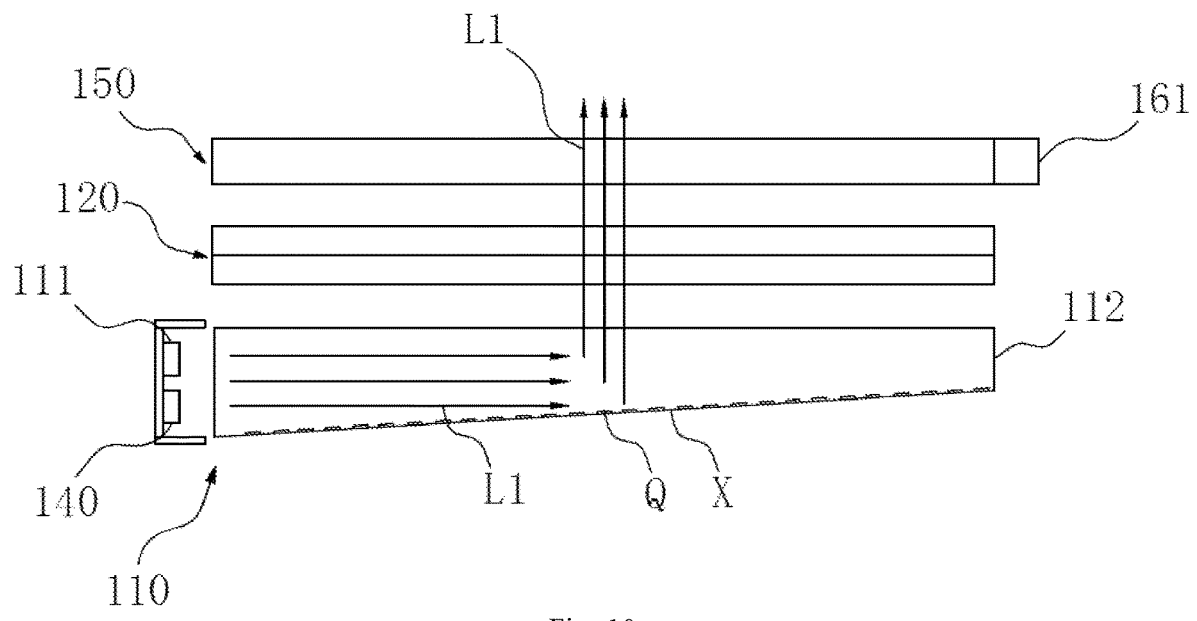
FIG. 10 is a schematic structural diagram of a backlight module of a display screen module as provided in another embodiment of this disclosure.

As shown in FIG. 10, in an embodiment, the backlight module 110 is of a side emitting structure including a light guide panel 112, and the first light source 140 and the backlight source 111 are arranged at one side of the light guide panel 112.

In an embodiment, the first light source 140 may be formed by a plurality of infrared transmitters connected in series or in parallel. The backlight source 111 may be formed by a plurality of white LED lamps connected in series or in parallel. In addition, the first light source 140 and the backlight source 111 may in a matrix arrangement. For example, the first light source 140 may form a first matrix, and the backlight source 111 may form a second matrix, and then the two matrices may be merged into a single integral matrix. For another example, the first light source 140 may be unorderly arranged in a gap of the backlight source 111, and the first light source 140 and the backlight source 111 together form a single integral matrix.

In an embodiment, the light guide panel 112 may be a wedge-shaped panel or a flat panel. In the case that the light guide panel 112 is a wedge-shaped panel, light reflective diffusion points may be printed on an inclined surface of the light guide panel 112, or light reflective tiny bumps may be densely distributed inside the light guide panel 112. In the case that the light guide panel 112 is a flat panel, the light reflective tiny bumps may be densely distributed inside the light guide panel 112.

An embodiment will be illustrated by way of an example in the following.

Referring to FIG. 10, FIG. 10 illustrates the light guide panel 112 as a wedge-shaped panel. After the first light source 140 emits a first light L1 from a lateral side of the light guide panel 112 toward another lateral side of light guide panel 112, the first light L1 may enter the interior of the light guide panel 112. At the point where the first light L1 reaches an inclined plane X of the light guide panel 112, the first light L1 will be reflected by diffusion points Q provided on the inclined plane X. Therefore, the first light L1 can be deflected into light perpendicular to the LCD screen 120 by means of the diffusion points Q and the inclined plane X.

It would be understood by those having ordinary skill in the art that a reflective plate is arranged at the bottom of the light guide panel 112, that is, the side of the light guide panel 112 facing away from the LCD screen 120, the reflective plate is configured to reflect the light which would escape from the bottom of the light guide panel 112 back into the light guide panel 112, so as to improve the light efficiency.

In an embodiment, since the first light source 140 and the backlight source 111 are arranged at one side of the light guide panel 112, in additional to eliminating the need for an additional position for disposing the first light source 140 to avoid excessively increasing the thickness of the display module 100, no excessive increase is needed for the thickness of the display module 100 to perform under screen fingerprint identification of the LCD screen by means of the construction of the backlight module 110.

Figure 11A:
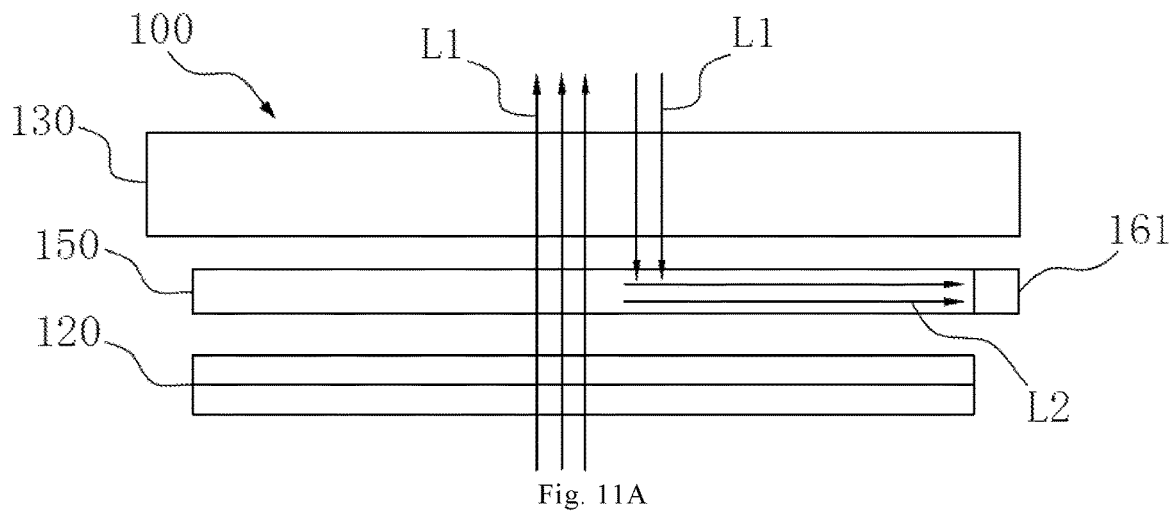
FIG. 11A is a schematic structural diagram of a display screen module as provided in another embodiment of this disclosure.

As shown in FIG. 11A, in an embodiment, the light receiving module 160 includes a photosensitive sensor 161 configured to receive the second light L2 for fingerprint identification, the photosensitive sensor 161 is arranged to face the reflective component 150.

Figure 11B:
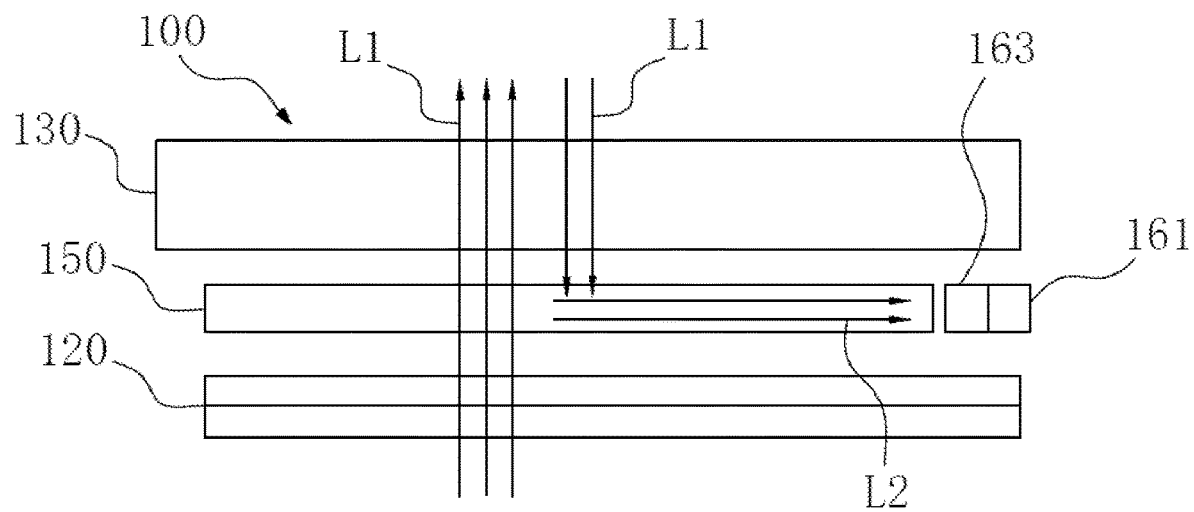
FIG. 11B is a schematic structural diagram of a display screen module as provided in another embodiment of this disclosure.

In an embodiment, the photosensitive sensor 161 may have various implementations. For example, the photosensitive sensor 161 may be an infrared receiver, a Charge Coupled Device (CCD) image sensor or a Complementary Metal-Oxide-Semiconductor (CMOS) image sensor. In the case that the photosensitive sensor 161 is an infrared receiver, referring to FIG. 11A, the photosensitive sensor 161 may be arranged directly adjacent to the reflective component 150 and facing the second light L2. In the case that the photosensitive sensor 161 is a CCD image sensor or a CMOS image sensor, referring to FIG. 11B, the photosensitive sensor 161 may be matched with a lens 163 first, and then arranged adjacent to the reflective component 150 and facing the second light L2.

In an embodiment, it is necessary to adaptively provide the photosensitive sensor 161 based on the type of the first light source 140. For example, the photosensitive sensor 161 shall be provided as an infrared receiver in the case that the first light source 140 is an infrared transmitter in this embodiment shown in FIG. 11B, so that is used as.

Figure 12:
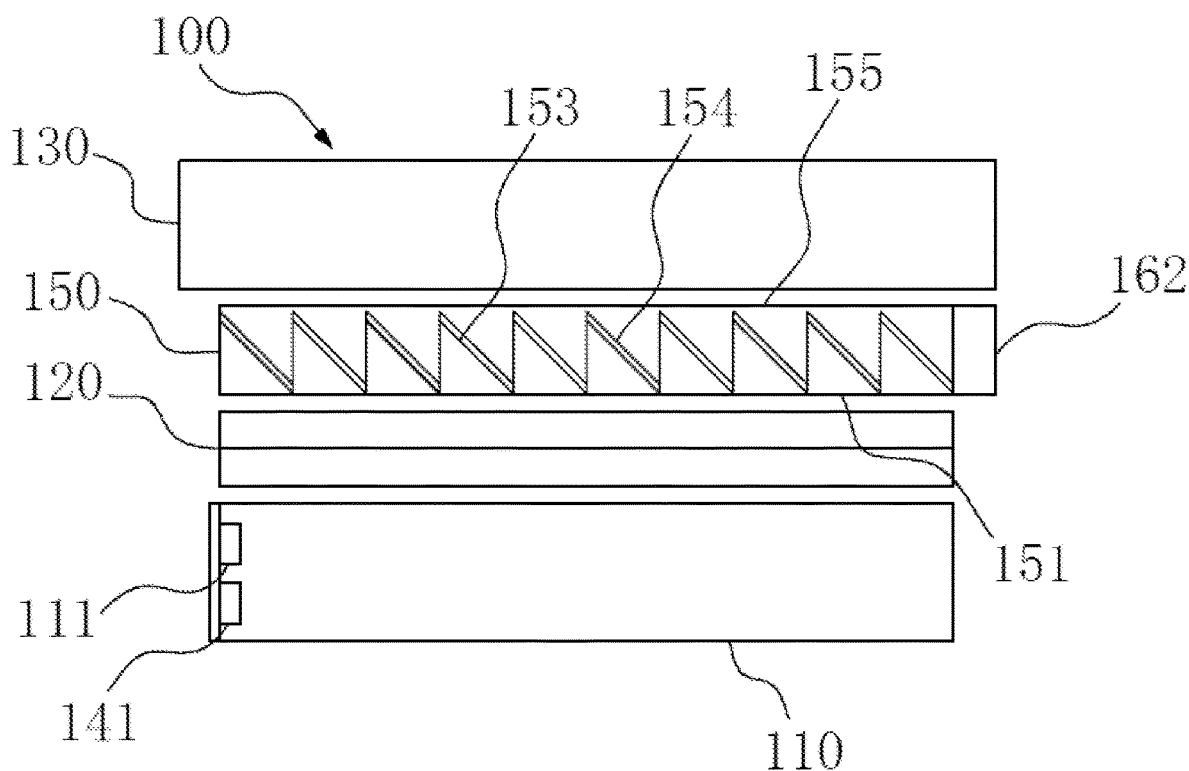
FIG. 12 is a schematic structural diagram of a display screen module as provided in another embodiment of this disclosure.

As shown in FIG. 12, another embodiment of this disclosure further provides a display module. Referring to FIG. 12, the display module 100 includes a backlight module 110, an LCD screen 120, a light-transmissible cover plate 130, an infrared transmitter 141, a reflective component 150 and an infrared receiver 162. The backlight module 110, the LCD screen 120, the reflective component 150 and the cover plate 130 are arranged one after another from bottom to top. The infrared transmitter 141 is arranged in a backlight source 111 of the backlight module 110 and is independent from the backlight source 111. The infrared receiver 162 is arranged adjacent to a lateral side of the reflective component 150 and facing the reflective component 150. The reflective component 150 is provided with a first light incident surface 151 facing the LCD screen 120 and a second light incident surface 155 facing the cover plate 130. A light reflective surface 153 is arranged between the first light incident surface 151 and the second light incident surface 155, and forms an acute angle of 45° with both the first light incident surface 151 and the second light incident surface 155. A reflective coating 154 capable of directional reflection is arranged at one side of the light reflective surface 153 facing the cover plate 130.

In the embodiment shown in FIG. 12, by means of the arrangement in which the infrared transmitter 141 independent from the backlight source 111 is arranged in the backlight source 111 of the backlight module 110, the reflective component 150 provided with the light reflective surface 153 is arranged between the LCD screen 120 and the cover plate 130, and the reflective coating 154 capable of directional reflection is arranged at the side of the light reflective surface 153 facing the cover plate 130, the reflective component 150 can reflect the first light L1 reflected by the finger pulp to form a second light L2, and the second light L2 can travel toward the infrared receiver 162. Therefore, the infrared receiver 162 can receive the second light L2 for fingerprint identification, so as to achieve the purpose of under-screen fingerprint identification with an LCD screen. In addition, thanks to the infrared transmitter 141 arranged in the backlight source 111, no additional position is needed for installing the infrared transmitter 141. And thanks to the infrared receiver 162 arranged adjacent to the lateral side of the reflective component 150 and facing the reflective component 150, the problem of excessively increasing the thickness of the display module 100 can be avoided. Therefore, in this embodiment, the under-screen fingerprint identification with an LCD screen can be realized without excessively increasing the thickness of the display module 100, thereby meeting the use requirements of users for large battery capacities, ultra-thin bodies and large display screens of smart terminal devices.

In addition, another embodiment of this disclosure further provides a terminal device. The terminal device includes the display screen module 100 in any of the above-mentioned embodiments. The terminal device has the beneficial effects brought by the display module 100 as mentioned in any of the above-mentioned embodiments. For example, in the terminal device, by means of the arrangement in which the first light source 140 independent from the backlight source 111 is arranged in the backlight source 111 of the backlight module 110, the reflective component 150 provided with the light reflective surface 153 is arranged between the backlight module 110 and the cover plate 130, and the reflective coating 154 capable of directional reflection is arranged at the side of the light reflective surface 153 facing the cover plate 130, the reflective component 150 can reflect the first light L1 reflected by the finger pulp to form a second light L2, and the second light L2 can travel toward the infrared receiver 162. In addition, the light receiving module 160 arranged adjacent to the reflective component 150 and facing the reflective component 150 can receive the second light L2 for fingerprint identification, thereby achieving the purpose of realizing under-screen fingerprint identification with an LCD screen. In addition, thanks to the first light source 140 arranged in the backlight source 111, no additional position is needed for installing the first light source 140. And thanks to the light receiving module 160 is arranged adjacent to the reflective component 150 and facing the reflective component 150, the problem of excessively increasing the thickness of the display screen module 100 can be avoided. Therefore, with the terminal device provided in the embodiment of this disclosure, the under-screen fingerprint identification with an LCD screen can be realized without excessively increasing the thickness of the display module, thereby meeting the use requirements of users for large battery capacities, ultra-thin bodies and large display screens of smart terminal devices.

It would be understood by those having ordinary skills in the art that, the terminal device as described in this disclosure may be an information processing device such as a mobile device like a smart phone, a tablet or a PC, or any device having a screen.

In the embodiments of this disclosure, by arranging the first light source independent from the backlight source in the backlight source of the backlight module, no additional position is needed for installing the first light source. In addition, the reflective component is arranged between the backlight module and the cover plate, and the light receiving module is arranged to face the reflective component and can receive light reflected by the reflective component. For example, the light receiving module may be arranged facing a lateral side surface of the reflective component and located on a propagation path of light reflected by the reflective component. The lateral side surface of the reflective component is at least one lateral side surfaces other than the upper side surface and the lower side surface, thus avoiding the problem of excessively increasing the thickness of the display screen module. Furthermore, since the light receiving module can receive the light reflected by the reflective component for fingerprint identification, the under-screen fingerprint identification with an LCD screen is realized. Therefore, according to the scheme provided in the embodiment of this disclosure, the under-screen fingerprint identification with an LCD screen can be realized without excessively increasing the thickness of the display module, thereby meeting the use requirements of users for large battery capacities, ultra-thin bodies and large display screens of terminal devices.

The device embodiments described above are intended to be illustrative merely, and the units described as separate components may or may not be physically separated. Some or all of the modules may be selected as needed to achieve the purpose of this embodiment.

The above is a detailed description of the some embodiments of this disclosure, but this disclosure is not limited to the above embodiments. Those having ordinary skills in the art can also make various equivalent modifications or alternatives without departing the scope of this disclosure, and these equivalent modifications or alternatives are within the scope defined by the claims of this disclosure.

The invention claimed is:

1. A display screen module, comprising:
a backlight module,
an LCD screen arranged above the backlight module, and
a light-transmissible cover plate arranged above the LCD screen,
wherein the display screen module further comprises:
a first light source arranged in the backlight module and being independent from a backlight source of the backlight module;
a reflective component arranged between the backlight module and the cover plate; and
a light receiving module arranged to face the reflective component and configured to receive light reflected by the reflective component;
wherein the reflective component is provided with a first light incident surface configured to allow incidence of light, a light transmitting surface perpendicular to the first light incident surface, and a light reflective surface configured to allow reflection of light, wherein the light reflective surface extends to a position where the light reflective surface is connected with the light transmitting surface, and the first light incident surface is arranged to face the LCD screen, and the light reflective surface is a plane surface oriented to form an acute angle with the light transmitting surface.

2. The display screen module of claim 1, wherein the light reflective surface is coated with a reflective coating configured to allow directional reflection of light.

3. The display screen module of claim 1, wherein the backlight module is of a side emitting structure comprising a light guide panel, and the first light source and the backlight source are arranged at one side of the light guide panel.

4. The display screen module of claim 1, wherein the light receiving module comprises a photosensitive sensor configured to receive light reflected by the reflective component, and the photosensitive sensor is arranged facing the reflective component.

5. A terminal device, comprising the display screen module of claim 1.

6. The terminal device of claim 5, wherein the light reflective surface is coated with a reflective coating configured to allow directional reflection of light.

7. The terminal device of claim 5, wherein the backlight module is of a side emitting structure comprising a light guide panel, and the first light source and the backlight source are arranged at one side of the light guide panel.

8. The terminal device of claim 5, wherein the light receiving module comprises a photosensitive sensor configured to receive light reflected by the reflective component, and the photosensitive sensor is arranged facing the reflective component.

9. A display screen module, comprising:
a backlight module,
an LCD screen arranged above the backlight module, and
a light-transmissible cover plate arranged above the LCD screen,
wherein the display screen module further comprises:
a first light source arranged in the backlight module and being independent from a backlight source of the backlight module;
a reflective component arranged between the backlight module and the cover plate; and
a light receiving module arranged to face the reflective component and configured to receive light reflected by the reflective component;
wherein the reflective component is provided with a first light incident surface and a second light incident surface, the first light incident surface and the second light incident surface are configured to allow incidence of light, wherein a light reflective surface configured to allow reflection of light is arranged between the first light incident surface and the second light incident surface, the first light incident surface is arranged to face the LCD screen, and the second light incident surface is arranged to face the cover plate; and the light reflective surface is a plane surface oriented to form an acute angle with the second light incident surface, and the first light incident surface and the second light incident surface are arranged parallel to each other.

10. The display screen module of claim 9, wherein the light reflective surface is coated at a side facing the second light incident surface, with a reflective coating configured to allow directional reflection of light.

11. A terminal device, comprising the display screen module of claim 9.

12. The terminal device of claim 11, wherein the light reflective surface is coated at a side facing the second light incident surface, with a reflective coating configured to allow directional reflection of light.

13. The display screen module of claim 9, wherein the backlight module is of a side emitting structure comprising a light guide panel, and the first light source and the backlight source are arranged at one side of the light guide panel.

14. The display screen module of claim 9, wherein the light receiving module comprises a photosensitive sensor configured to receive light reflected by the reflective component, and the photosensitive sensor is arranged facing the reflective component.

15. The terminal device of claim 11, wherein the backlight module is of a side emitting structure comprising a light guide panel, and the first light source and the backlight source are arranged at one side of the light guide panel.

16. The terminal device of claim 11, wherein the light receiving module comprises a photosensitive sensor configured to receive light reflected by the reflective component, and the photosensitive sensor is arranged facing the reflective component.

\* \* \* \* \*